United States Patent
Mitsutomi et al.

(10) Patent No.: US 10,145,447 B2
(45) Date of Patent: Dec. 4, 2018

(54) POWER-TRANSMITTING FRICTION BELT AND METHOD FOR MANUFACTURING SAME

(71) Applicant: Mitsuboshi Belting Ltd., Kobe-shi, Hyogo (JP)

(72) Inventors: Manabu Mitsutomi, Hyogo (JP); Tsuyoshi Takehara, Hyogo (JP); Kazuyo Kojima, Hyogo (JP)

(73) Assignee: Mitsuboshi Belting Ltd., Kobe-shi, Hyogo (JP)

( * ) Notice: Subject to any disclaimer, the term of this patent is extended or adjusted under 35 U.S.C. 154(b) by 259 days.

(21) Appl. No.: 15/039,944

(22) PCT Filed: Nov. 26, 2014

(86) PCT No.: PCT/JP2014/081260
§ 371 (c)(1),
(2) Date: May 27, 2016

(87) PCT Pub. No.: WO2015/080157
PCT Pub. Date: Jun. 4, 2015

(65) Prior Publication Data
US 2017/0009847 A1   Jan. 12, 2017

(30) Foreign Application Priority Data

Nov. 29, 2013 (JP) .................................. 2013-247879
Nov. 20, 2014 (JP) .................................. 2014-235672

(51) Int. Cl.
*D04B 21/20* (2006.01)
*F16G 5/08* (2006.01)
(Continued)

(52) U.S. Cl.
CPC ............... *F16G 5/08* (2013.01); *D04B 21/20* (2013.01); *F16G 1/10* (2013.01); *F16G 5/06* (2013.01);
(Continued)

(58) Field of Classification Search
CPC ... D04B 21/20; D10B 2403/0312; F16G 1/10; F16G 5/06; F16G 5/08; F16G 5/20;
(Continued)

(56) References Cited

U.S. PATENT DOCUMENTS 3,981,206 A   9/1976   Miranti, Jr. et al.
5,654,086 A   8/1997   Nishijima et al.
(Continued)

FOREIGN PATENT DOCUMENTS

CN   1151455 A   6/1997
CN   1168424 A   12/1997
(Continued)

OTHER PUBLICATIONS https://www.quora.com/What-is-the-difference-between-warp-knitting-and-weft-knitting-and-how-to-identify-if-the-fabric-is-made-by-warp-or-weft. no date.*
(Continued)

*Primary Examiner* — Arti Singh-Pandey
(74) *Attorney, Agent, or Firm* — Banner & Witcoff, Ltd.

(57) ABSTRACT

The present invention relates to a frictional power transmission belt having a frictional power transmission surface covered with a warp knitted fabric, in which the warp knitted fabric contains a water absorptive thread in a proportion of 30% by mass or more based on the total amount of threads constituting the warp knitted fabric and a wale direction of the warp knitted fabric is substantially parallel to a belt longitudinal direction.

14 Claims, 4 Drawing Sheets

(51) Int. Cl.
*F16G 5/06* (2006.01)
*F16G 5/20* (2006.01)
*F16G 1/10* (2006.01)

(52) U.S. Cl.
CPC ........ *F16G 5/20* (2013.01); *D10B 2403/0312* (2013.01)

(58) Field of Classification Search
CPC ....... B29D 29/08; B32B 2433/04; B32B 5/10; B32B 5/026; B32B 5/30
See application file for complete search history.

(56) References Cited

U.S. PATENT DOCUMENTS

| | | | |
|---|---|---|---|
| 5,902,679 | A | 5/1999 | Kojima et al. |
| 6,848,281 | B2 | 2/2005 | Ishihara et al. |
| 8,028,547 | B2 | 10/2011 | Suzuki et al. |
| 8,262,523 | B2 | 9/2012 | Kanzow et al. |
| 9,341,233 | B2 | 5/2016 | Mori et al. |
| 2003/0211798 | A1 | 11/2003 | Ishihara et al. |
| 2008/0261739 | A1 | 10/2008 | Kanzow et al. |
| 2010/0167860 | A1 | 7/2010 | Mori et al. |
| 2010/0173740 | A1 | 7/2010 | Mori et al. |
| 2011/0056248 | A1 | 3/2011 | Suzuki et al. |
| 2011/0129647 | A1 | 6/2011 | Duke, Jr. et al. |
| 2014/0135161 | A1 | 5/2014 | Mori et al. |
| 2014/0364262 | A1 | 12/2014 | Mori et al. |
| 2016/0273616 | A1* | 9/2016 | Takehara .................. F16G 5/20 |

FOREIGN PATENT DOCUMENTS

| | | | |
|---|---|---|---|
| CN | 1456724 | A | 11/2003 |
| CN | 101375081 | A | 2/2009 |
| JP | S52-031260 | A | 3/1977 |
| JP | 2001289284 | * | 10/2001 ............... F16G 1/00 |
| JP | 2008-115974 | A | 5/2008 |
| JP | 2010-053935 | A | 3/2010 |
| JP | 2010-242825 | A | 10/2010 |
| JP | 2012-045895 | A | 3/2012 |
| JP | 4942767 | B2 | 5/2012 |
| JP | 2013-213576 | A | 10/2013 |
| JP | 5302074 | B2 | 10/2013 |
| JP | 5337795 | B2 | 11/2013 |
| WO | 2009/034748 | A1 | 3/2009 |
| WO | 2009/133821 | A1 | 11/2009 |

OTHER PUBLICATIONS

Mar. 3, 2015—International Search Report—Intl App PCT/JP2014/081260.
Dec. 8, 2017—(CN) Notification of the Second Office Action—App 201480065366.5.
Jul. 5, 2017—(EP) Search Report—App 14865281.1.
Mar. 16, 2017—(CN) Notification of First Office Action—App 201480065366.5.
Jun. 4, 2018—(EP) Office Action—App 14865281.1.

\* cited by examiner

[FIG. 1]
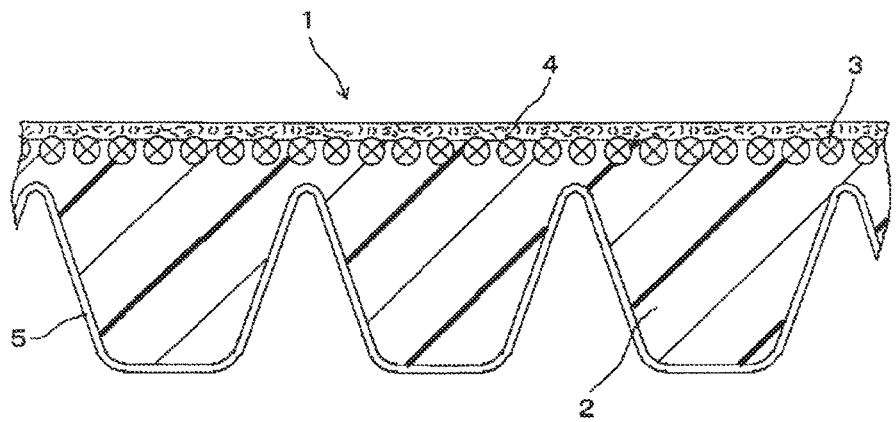
[FIG. 2]
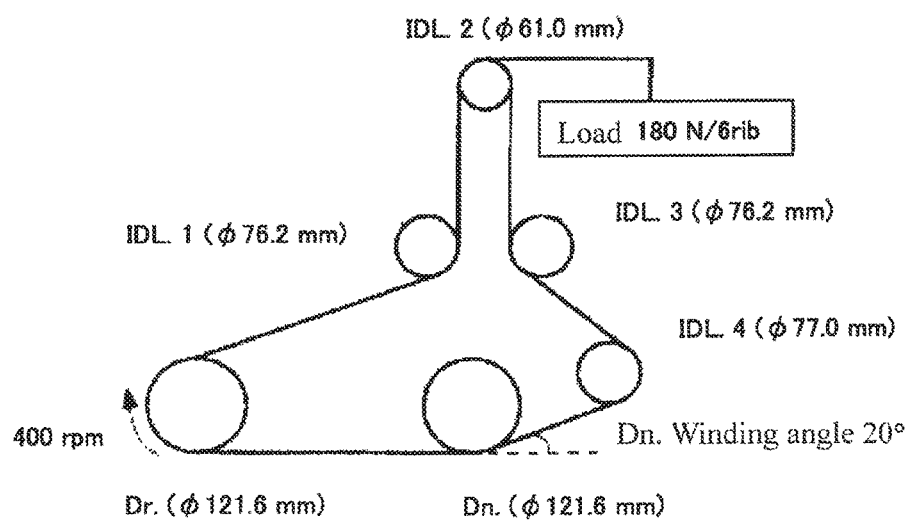

[FIG. 3]
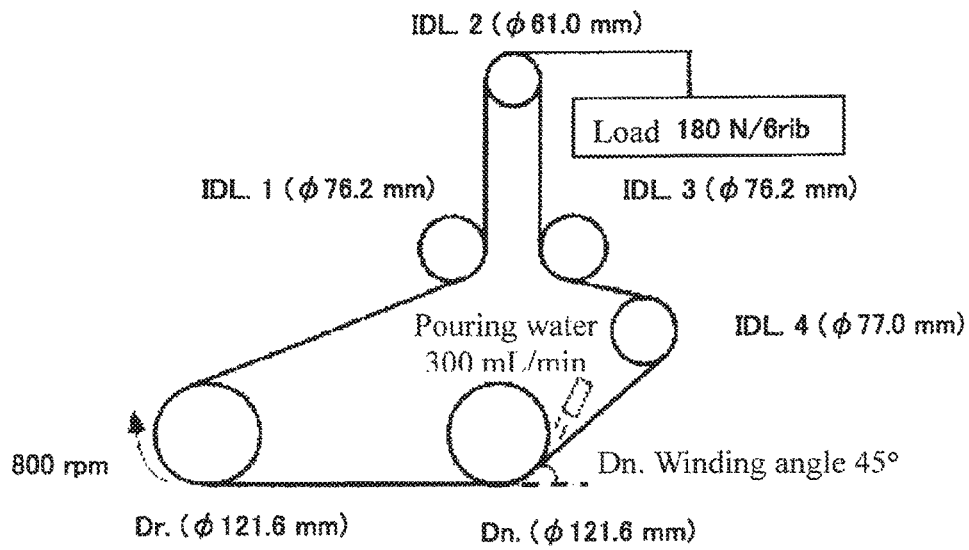
[FIG. 4]
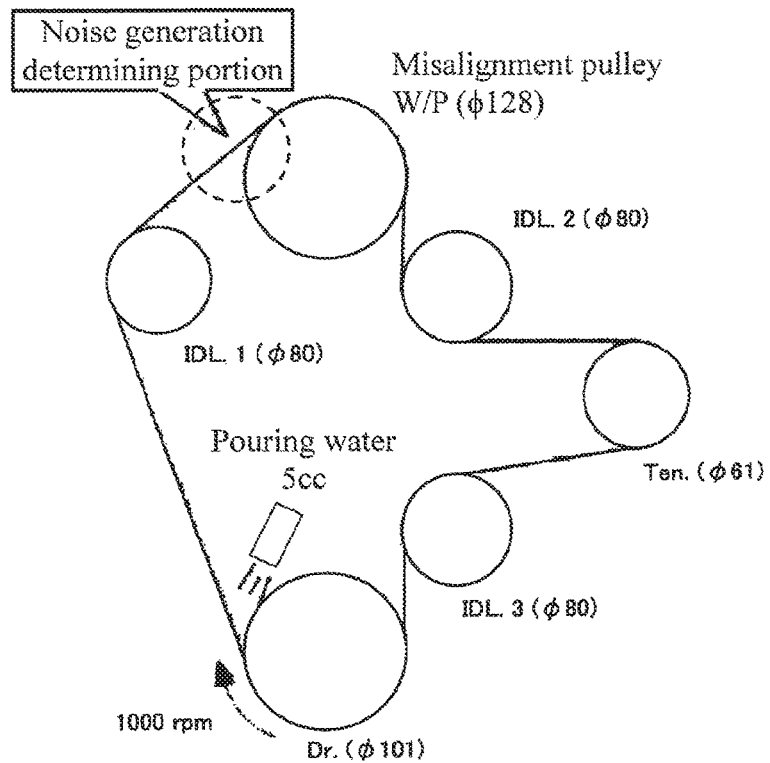

[FIG. 5]
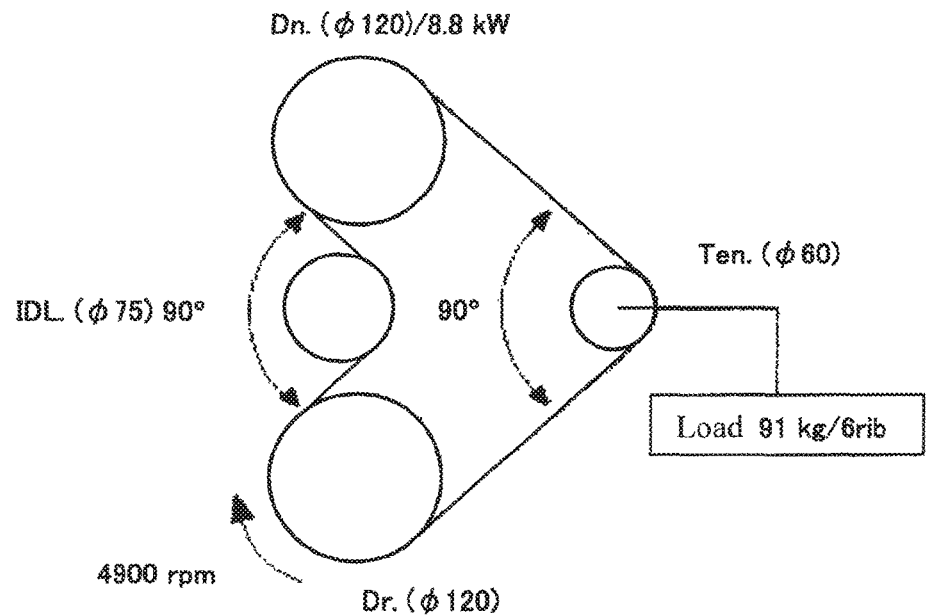
[FIG. 6]
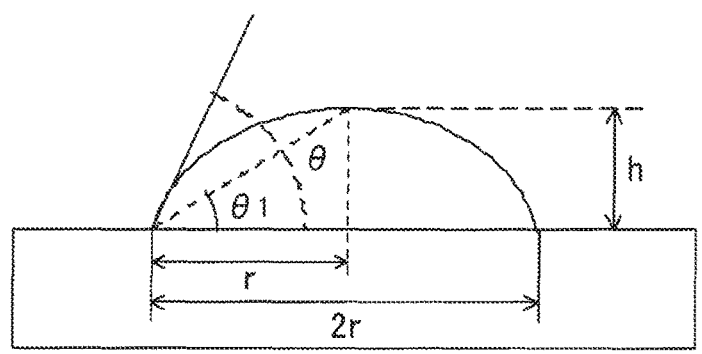

[FIG. 7]
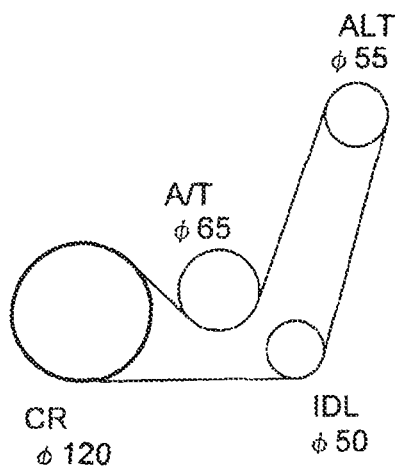
[FIG. 8]
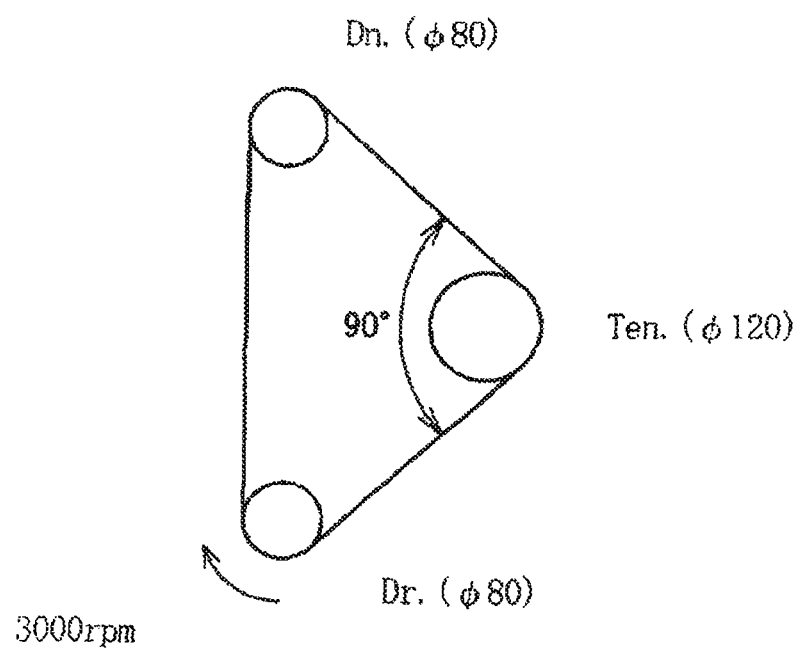

POWER-TRANSMITTING FRICTION BELT AND METHOD FOR MANUFACTURING SAME

CROSS REFERENCE TO RELATED APPLICATIONS

This is a U.S. National Phase Application under 35 U.S.C. § 371 of International Application No. PCT/JP2014/081260, filed Nov. 26, 2014, which claims priority to Japanese Application Nos. 2013-247879 and 2014-235672 filed Nov. 29, 2013 and Nov. 20, 2014, respectively, and which was published Under PCT Article 21(2), the entire contents of which are incorporated herein by reference.

TECHNICAL FIELD

The present invention relates to a frictional power transmission belt used for driving automobile engine auxiliary machines, and its manufacturing method, and in detail, it relates to a V-ribbed belt in which a frictional power transmission surfaces to be in contact with pulleys are coated with a warp knitted fabric, and its manufacturing method.

BACKGROUND ART

In the field of rubber industry, especially, automobile components are desired to have advanced function and performance. A frictional power transmission belt is one of rubber products used in such automobile components, and the frictional power transmission belt is widely used for, for example, power transmission of auxiliary drive of automobile air compressors, alternators and the like.

For example, a V-ribbed belt having ribs provided in a belt longitudinal direction is known as the belt of this kind. In recent years, a V-ribbed belt having silence (sounding resistance during drying and water pouring) or durability (abrasion resistance), particularly having both performances, is required as the V-ribbed belt. Furthermore, when water penetrates between a frictional power transmission surface having low water wettability and pulleys, water penetration condition becomes uneven between a belt and pulleys, and stick-slip sound is easy to be generated. For this reason, the improvement in sounding resistance when exposed to water is also required.

In response to this requirement, the means of covering a frictional power transmission surface with a fabric formed of fibers is known. In a V-ribbed belt in which rib portions are formed by a mold, the means of covering a frictional power transmission surface with a fabric is preferred for the reason that the fabric can be simultaneously fixed to the frictional power transmission surface during molding. Woven fabric made by weaving or knitted fabric made by knitting is used as the fabric. The knitted fabric has advantages that it is provided with flexibility to easily place along a frictional power transmission surface having concavo-convex formed due to a plurality of rib portions and it can easily secure stretchability of flowing up deformation of a belt body and stretching.

Japanese Patent No. 4942767 (Patent Document 1) discloses a V-ribbed belt having a layer of a warp knitted fabric containing two different kinds of yarns. This warp knitted fabric is constituted of a first yarn (e.g., polyamide) comprising filaments having a module of more than 5 N/1000 dtex at 5% extension and a second yarn (e.g., polyurethane) comprising filaments having a module of less than 2 cN/1000 dtex at 5% extension, and is characterized in that each of the first yarn and the second yarn forms a condensed network structure and the yarns are not mutually twined. For this reason, it is described that a V-ribbed belt can be effectively formed by elastic warp knitted fabric, whose extension does not depend on the construction of the knitted fabric, long-term durability can be improved, and noise generation can be suppressed. This document further describes that in the case where the knitting direction of the warp knitted fabric is arranged in a belt direction, only quite short pieces of yarn extend in the belt direction, the warp knitted fabric is dynamically stabilized, and polyamide fibers positioned outside efficiently protect a network structure from abrasion. It is further described that a flock layer such as cotton is formed on the surface of the warp knitted fabric in order to prevent generation of noise under the influence of a large amount of water.

However, in this V-ribbed belt, the yarns constituting the warp knitted fabric are the combination of polyamide or polyester and polyurethane, and water absorption is low. Therefore, water screen cannot be removed when exposed to water, and there is a concern of generation of sound. Furthermore, the relationship between a belt direction and a knitting direction of a warp knitted fabric is described, but specific data are not shown. It is assumed that the improvement in abrasion resistance greatly depends on the effect according to the polyamide fibers having excellent strength and stretchability, positioned outside (frictional power transmission surface) the knitted fabric. Furthermore, in the case where a flock layer is formed on the surface of the knitted fabric, the flock layer is easy to fall off during traveling.

Japanese Patent No. 5337795 (Patent Document 2) discloses, as a first embodiment, a V-ribbed belt in which the surface of ribs is covered with a fabric stretchable in predetermined two directions and containing cellulose fibers. It is described that in this embodiment, a weft knitted fabric showing satisfactory extensibility in two directions may be used as the fabric. It is further described that in this embodiment, because the surface of ribs is covered with a fabric and the fabric contains cellulose (cotton), abnormal noise generation can be suppressed at the time of slipping or being exposed to water. As a second embodiment, a V-ribbed belt in which a rubber is penetrated from the fabric covering the surface of ribs and is exposed on a frictional power transmission surface is disclosed. It is described that the characteristics (friction coefficient and abrasion resistance) of the rib surface can be controlled by controlling the amount of rubber penetrated onto the rib surface.

However, the V-ribbed belt of the first embodiment contains a large amount of cellulose (cotton). Therefore, abrasion resistance of the belt surface is decreased. Furthermore, in the V-ribbed belt of the second embodiment, in the case where the rib rubber layer penetrates on the rib surface, the area at which the fabric (weft knitted fabric) exposes on the surface thereof is decreased. Therefore, a friction coefficient in a dry state is increased. Furthermore, even though the fabric contains cellulosic fibers and shows water absorbability, it cannot absorb the water screen sufficiently on the whole frictional power transmission surface due to the presence of the rubber layer, the part in a dry state (DRY) and the part in a water-exposed state (WET) are present together. As a result, the difference in the friction coefficient of those parts is increased, and therefore, there is a concern of sound generation. Furthermore, rubber is penetrated from the fabric in the second embodiment, but even in the first embodiment, the fabric is made to follow on the rib surface by utilizing its stretchability, and therefore, the rubber is liable to partially penetrate the fabric to be exposed on the surface.

Japanese Patent No. 5302074 (Patent Document 3) discloses a V-ribbed belt covered with a rib-side knit reinforcement cloth in which the rate of elongation when load of 50 N is applied to a strip test piece having a width of 3 cm is from 100 to 500% in a belt length direction and the rate of elongation in a belt width direction is from 150 to 500%. This V-ribbed belt is characterized in that a rib surface rubber layer is provided between a rib of the belt body and the rib-side knit reinforcement cloth, and the rib surface rubber layer is partially oozed out of stitches of the rib-side knit reinforcement cloth to be exposed on a pulley contact surface. It is described that a pulley contact part can be maintained in a state of low friction coefficient without deteriorating heat resistance, and excellent abnormal sound generation suppressing effect can be obtained during belt traveling. Furthermore, this document describes that the increase of a friction coefficient due to follow-up properties of the knit reinforcement cloth into a rib shape and due to oozing of a rubber can be controlled by specifying the rate of elongation of the knit reinforcement cloth in a longitudinal direction and width direction of a belt to a specific range.

However, this V-ribbed belt is that a rubber layer is exposed on a pulley contact part (rib surface). Therefore, a friction coefficient is greatly decreased when exposed to water, and there is a concern of sound generation. Furthermore, in the knit (knitted fabric), generally extension and strength greatly differ depending on a knitting direction. It is not clearly described in this document as to a knitted texture of a knit reinforcing cloth and as to whether a knitting direction of a knit corresponds to either direction of a belt longitudinal direction or width direction.

PRIOR ART DOCUMENT

Patent Document

Patent Document 1: Japanese Patent No. 4942767
Patent Document 2: Japanese Patent No. 5337795
Patent Document 3: Japanese Patent No. 5302074

SUMMARY OF THE INVENTION

Problems that the Invention is to Solve

Accordingly, an object of the present invention is to provide a frictional power transmission belt that can improve quietness (silence or sound generation resistance) and abrasion resistance, and its manufacturing method.

Another object of present invention is to provide a frictional power transmission belt that has high abrasion resistance and can improve quietness when exposed to water, and its manufacturing method.

Still another object of the present invention is to provide a frictional power transmission belt that can maintain quietness even after travel deterioration, and its manufacturing method.

Further object of the present invention is to provide a frictional power transmission belt that has high productivity and can improve quietness and abrasion resistance over a long period of time, and its manufacturing method.

Means for Solving the Problems

As a result of intensive investigations to achieve the problems, the inventors have found that quietness (silence or sound generation resistance) and abrasion resistance can be improved by covering a frictional power transmission surface of a frictional power transmission belt with a warp knitted fabric containing a water absorptive thread in a proportion of 30% by mass or more while setting a wale direction so as to be substantially parallel to a belt longitudinal direction, and have completed the present invention.

That is, the frictional power transmission belt according to the present invention is a frictional power transmission belt having a frictional power transmission surface covered with a warp knitted fabric, in which the warp knitted fabric contains a water absorptive thread in a proportion of 30% by mass or more based on the total amount of threads constituting the warp knitted fabric and a wale direction of the warp knitted fabric is substantially parallel to a belt longitudinal direction. The warp knitted fabric may further contain a non-water absorptive thread, and a mass ratio between the water absorptive thread and the non-water absorptive thread may be the former/the latter=from 50/50 to 90/10. The non-water absorptive thread may contain a polyester fiber and/or a polyurethane fiber. The warp knitted fabric may be a single tricot knitted fabric or a half tricot knitted fabric. The warp knitted fabric may have an elongation of 80% or more in a course direction and a tensile strength at break of 150 N or more in a wale direction, when a load of 50 N is applied to a test piece having a size of 5 cm width and 25 cm length in a tensile test. The warp knitted fabric may have a density of from about 20 to 60 number/inch in a wale direction and from about 20 to 60 number/inch in a course direction. The warp knitted fabric may have a thickness of from about 0.5 to 1.0 mm. The warp knitted fabric may have a volume per unit mass of 2.5 $cm^3$/g or more. The water absorptive thread may contain a cellulosic fiber. The warp knitted fabric may contain a surfactant (especially, nonionic surfactant). The frictional power transmission belt according to the present invention may be a V-ribbed belt containing a tension layer forming the back of the belt, a compression layer formed on one surface of the tension layer and contacting pulleys at a side surface thereof to frictionally engage, and a tension member embedded along a longitudinal direction of the belt between the tension layer and the compression layer, in which the compression layer may have the frictional power transmission surface and the frictional power transmission surface may be covered with the warp knitted fabric. In the frictional power transmission belt, it is preferable that the compression layer is formed by a rubber, and the rubber does not ooze on the surface of the frictional power transmission surface covered with the warp knitted fabric.

The present invention includes a manufacturing method of the frictional power transmission belt, containing a covering step of covering a frictional power transmission surface of a belt with a warp knitted fabric while setting a wale direction of the warp knitted fabric so as to be substantially parallel to a belt longitudinal direction.

Advantage of the Invention

In the power transmission belt of the present invention, a frictional power transmission surface of the frictional power transmission belt is covered with a warp knitted fabric containing a water absorptive thread in a proportion of 30% by mass or more while setting a wale direction to be substantially parallel to a belt longitudinal direction. Therefore, quietness (silence or sound generation resistance) and abrasion resistance can be improved. Furthermore, since the warp knitted fabric contains a water absorptive thread, the belt has high abrasion resistance, and additionally, quietness when exposed to water can be improved. As a result, quietness and transmission performance can be improved by decreasing the difference of a friction coefficient in the frictional power transmission surface between when ordinary travel (DRY) and when exposed to water (WET). In other words, because a specific warp knitted fabric is covering while setting a wale direction so as to be substantially parallel to a belt longitudinal direction, high abrasion resistance can be maintained despite of containing water absorptive threads having low abrasion resistance such as cellulose fibers. Furthermore, because of excellent abrasion resistance, quietness can be maintained even after travel deterioration. Additionally, the frictional power transmission belt of the present invention does not require a cutting step for forming a frictional power transmission surface. Therefore, productivity is high, and additionally, quietness and abrasion resistance can be improved over a long period of time.

BRIEF DESCRIPTION OF THE DRAWINGS

FIG. 1 is a schematic cross-sectional view illustrating one example of the V-ribbed belt of the present invention.

FIG. 2 is a schematic view for explaining a measurement method of a friction coefficient in Examples.

FIG. 3 is a schematic view for explaining a measurement method of a friction coefficient (during water pouring) in Examples.

FIG. 4 is a schematic view for explaining a misalignment sound generation evaluation test in Examples.

FIG. 5 is a schematic view for explaining a durability test in Examples.

FIG. 6 is a schematic view for explaining a measurement test of a contact angle in Examples.

FIG. 7 is a schematic view for explaining a rotational fluctuation sound generation test in Examples.

FIG. 8 is a schematic view for explaining an abrasion test in Examples.

MODES FOR CARRYING OUT THE INVENTION (Warp Knitted Fabric)

The frictional power transmission belt of the present invention is that a frictional power transmission surface is covered with a warp knitted fabric. The warp knitted fabric is a fabric formed by knitting loops (stitches) in a warp direction. Furthermore, the warp knitted fabric is generally knitted by a plurality of threads, the thread enters in the warp direction, and loops are joined in the warp direction.

Knitted fabrics have excellent overall stretchability, and are easy to follow a contour (shape) of the frictional power transmission surface, but have anisotropy. Therefore, strength in a wale (a range in a warp direction of a knitted fabric) direction is large and stretchability in a course (a range in a weft direction of a knitted fabric) direction is large. Of those knitted fabrics, a warp knitted fabric is that the fabric is stable than a weft knitted fabric. In the present invention, the frictional power transmission surface of a frictional power transmission belt is covered with such a warp knitted fabric while setting a wale direction having large strength so as to be parallel (substantially parallel) to a belt longitudinal direction, and as a result, abrasion resistance of the frictional power transmission belt can be improved. On the other hand, even if the frictional power transmission surface is covered with a weft knitted fabric while setting a wale direction so as to be parallel to a belt longitudinal direction, abrasion resistance of the frictional power transmission belt cannot be sufficiently improved. For this reason, in the case where the frictional power transmission surface is covered with a warp knitted fabric as described above, quietness can be maintained even under severe conditions such as after travel deterioration. The mechanism that abrasion resistance of the frictional power transmission belt is improved is not clear, but it is assumed to be influenced by that in the case where cracks are generated in a course direction of a knitted fabric (belt width direction), the warp knitted fabric is difficult to get loose than the weft knitted fabric, and as a result, cracks are difficult to expand.

In the present description, the phrase "a wale direction of a warp knitted fabric is substantially parallel to a belt longitudinal direction" means that a wale direction of the warp knitted fabric is arranged at an angle of, for example, within 30° (particularly within) 10°, to the belt longitudinal direction.

Examples of the warp knitted fabric include warp knitted fabrics formed of a knitted texture such as tricot stitch, cord stitch, atlas stitch, or chain stitch, and specifically include single denbigh (single tricot), single cord, half tricot, double denbigh (plain tricot), double cord, satin tricot, double atlas, double tricot, and the like. Of those, single tricot and half tricot are preferred from the standpoints of simple structure, high fabric density and excellent abrasion resistance. Furthermore, a multilayered knitted fabric (double knitted fabric) such as half tricot, double denbigh, double atlas, double cord, and double tricot are preferred from the standpoints that bulkiness of a warp knitted fabric can be improved and oozing of a rubber can be suppressed, and half tricot is particularly preferred.

The areal weight (mass) of the warp knitted fiber is about, for example, from 100 to 400 $g/m^2$, preferably from 150 to 350 $g/m^2$, and more preferably from 200 to 300 $g/m^2$ (particularly from 210 to 280 $g/m^2$). In the case where the areal weight is too small, abrasion resistance tends to deteriorate, whereas in the case where it is too large, flexibility of a belt tends to deteriorate.

The thickness (average thickness) of the warp knitted fabric is about, for example, from 0.5 to 1.0 mm, preferably from 0.55 to 0.95 mm, and more preferably from 0.6 to 0.9 mm (particularly from 0.7 to 0.8 mm). In the case where the thickness is too small, abrasion resistance tends to deteriorate, whereas in the case where it is too large, flexibility of a belt tends to deteriorate.

The warp knitted fabric may have an elongation in a course direction of about 80% or more, for example, from 80 to 300%, preferably from 100 to 250%, and more preferably from 110 to 200% (particularly from 120 to 180%), when a load of 50 N is applied to a test piece having a size of 5 cm width and 25 cm length in a tensile test according to JIS L1096 (2010). In the case where the elongation in a course direction is too small, flexibility deteriorates and it becomes difficult to follow a frictional power transmission surface.

The warp knitted fabric may have a tensile strength at break in a wale direction of about 150 N or more, for example, from 150 to 500 N, preferably from 200 to 450 N, and more preferably from 250 to 400 N (particularly from 280 to 350 N), when a load of 50 N is applied to a test piece having a size of 5 cm width and 25 cm length in the tensile test described above. In the case where the tensile strength at break in a wale direction is too small, abrasion resistance of a frictional power transmission belt deteriorates.

The density of the warp knitted fabric is about, for example, from 20 to 60 number/inch, preferably from 25 to 55 number/inch, and more preferably from 30 to 50 number/inch (particularly from 35 to 45 number/inch), in a wale direction. In the case where the density in a wale direction is too small, abrasion resistance deteriorates and the amount of a rubber oozed is increased. On the other hand, in the case where it is too large, flexibility deteriorates.

The density of the warp knitted fabric is about, for example, from 20 to 60 number/inch, preferably from 22 to 55 number/inch, and more preferably from 23 to 50 number/inch (particularly from 25 to 45 number/inch), in a course. In the case where the density in a course direction is too small, abrasion resistance deteriorates and the amount of a rubber oozed is increased. On the other hand, in the case where it is too large, flexibility deteriorates.

In the present description, the density of the warp knitted fabric can be obtained by measuring the number of stitches per arbitrary 1 inch at five places and averaging those, in the method according to JIS L1096 (2010).

The warp knitted fabric is bulky, and therefore can suppress oozing of a rubber. The bulkiness (volume per unit mass) of the warp knitted fabric can be calculated by the following equation based on a thickness and an areal weight. The bulkiness of the warp knitted fabric may be 2.5 cm$^3$/g or more, and is about, for example, from 2.6 to 10 cm$^3$/g, preferably from 2.7 to 8 cm$^3$/g, and more preferably from 2.8 to 5 cm$^3$/g (particularly from 3.0 to 3.5 cm$^3$/g).

$$\text{Bulkiness} = \text{Thickness (mm)}/\text{Areal weight (g/m}^2\text{)} \times 1000$$

In the case where the frictional power transmission surface is formed of a rubber and the frictional power transmission surface is covered with the warp knitted fabric having various characteristics described above, the rubber does not ooze on the surface of the frictional power transmission surface, the covering effect of the warp knitted fabric is effectively developed, and abrasion resistance can be improved.

(Constituent Thread of Warp Knitted Fiber)

The warp knitted fabric contains a water-absorptive thread. It is sufficient that the water absorptive thread contains a water absorptive fiber, and it may be formed of a water absorptive fiber alone and may be formed of a water absorptive fiber and a non-water absorptive fiber.

Examples of the water absorptive fiber include polyvinyl alcohol fibers (polyvinyl alcohol, fibers of ethylene-vinyl alcohol copolymers, vinylon, etc.), cellulose-based fibers (cellulose fibers (cellulose fibers derived from plants, animals, bacteria, etc.), fibers of cellulose derivatives), and the like. Examples of the cellulose fibers include natural plant-derived cellulose fibers (pulp fibers) such as wood pulp (coniferous tree, broadleaf tree pulp, etc.), bamboo fibers, sugar cane fibers, seed hair fibers (cotton fibers (cotton linters), kapok, etc.), bast fibers (hemp, kouzo (paper mulberry), mitsumata (oriental paperbush), etc.), and leaf fibers (e.g., Manila hemp, New Zealand hemp, etc.); animal-derived celluloses such as sea squirts celluloses; bacterial cellulose fibers; algal celluloses, and the like. Examples of the fibers of cellulose derivatives include cellulose ester fibers; regenerated cellulose fibers (rayon, etc.), and the like. Further, polyamide fibers (e.g., aliphatic polyamide fibers such as polyamide 6 fiber, polyamide 66 fiber, and polyamide 46 fiber, etc.), wool and silk can also be used as the water absorptive fibers.

The water absorptive fiber may be used alone or in combination of two or more kinds thereof. Of these water absorptive fibers, cellulose-based fibers (cotton fiber, hemp, rayon, etc.) are preferred, and cotton fibers that are natural fibers excellent in water absorbability are particularly preferred.

Examples of the non-water absorptive fiber include synthetic fibers such as polyolefin fibers (polyethylene fiber, polypropylene fiber, etc.), non-water absorptive polyamide fibers (aromatic polyamide fibers such as aramide fiber), polyester fibers (e.g., $C_{2-4}$ alkylene $C_{6-14}$ arylate fibers such as polyethylene terephthalate (PET) fiber, polypropylene terephthalate (PPT) fiber, polytrimehylene terephthalate (PTT) fiber, and polyethylene naphthalate (PEN) fiber), polyparaphenylene benzobisoxazole (PBO) fibers, and polyurethane fibers; and inorganic fibers such as carbon fibers. The non-water absorptive fibers may be a conjugate fiber in which multi-component fibers are spun (composite fiber or bi-component fibers). The conjugate fiber may be a crimpable fiber (bulky fiber) having a structure that resins having different shrinkage are laminated in a layer form and in which crimps are developed by heating.

The non-water absorptive fiber may be used alone or in combination of two or more kinds thereof. Of those non-water absorptive fibers, it is preferred to contain a stretchable fiber (e.g., polyurethane fibers (or polyurethane elastic yarn or Spandex), and conjugate fibers) from standpoints that flexibility can be given to the warp knitted fibric and the follow-up properties to the frictional power transmission surface can be improved. The stretchable fiber (or elastic yarn) may be a fiber having stretchability imparted by stretching process (e.g., wooly finish or crimping finish). Furthermore, as the non-water absorptive fibers, preferred is one containing a $C_{2-4}$ alkylene $C_{6-14}$ arylate fiber such as PET fiber from the standpoint that abrasion resistance can be improved.

It is sufficient that the water absorptive thread contains a water absorptive fiber, and it may be non-composite thread (spun yarn, etc.) formed by single water absorptive fiber, and may be a composite yarn (combined filament yarn, twisted union yarn, covering yarn, blended yarn, etc.) containing a combination of a plurality of fibers having different material and form, for example, a composite yarn formed by plural kinds of water absorptive fibers, or a composite yarn formed by a water absorptive fiber and a non-water absorptive fiber. The composite yarn preferably contains a non-water absorptive fiber from the standpoint that stretchability can be improved, and may be a covering yarn in which a sheath yarn is a water absorptive fiber and a core yarn is a stretchable fiber such as polyurethane fibers.

The warp knitted fabric may contain a non-water absorptive thread, in addition to a water absorptive thread. It is sufficient that the non-water absorptive thread is formed by a non-water absorptive fiber, and it may be a non-composite yarn (e.g., monofilament yarn, multifilament yarn, etc.) formed by single non-water absorptive fiber, and may be a composite yarn (combined filament yarn, twisted union yarn, covering yarn, blended yarn, etc.) formed by plural kinds of non-water absorptive fibers.

As for the non-water absorptive fibers constituting the non-water absorptive thread, use can be made of the non-water absorptive fibers exemplified in the item of the water absorptive thread. The non-water absorptive fiber can be used alone or in combination of two or more kinds thereof. Of those non-water absorptive fibers, it is preferred to contain a polyester fiber and/or a polyurethane fiber from the standpoints of mechanical strength, stretchability and the like.

Of those non-water absorptive threads, preferred are a multifilament yarn, a non-conjugate yarn (monofilament yarn and multifilament yarn) containing composite fibers, and a composite yarn, from the standpoint of mechanical characteristics such as stretchability. The multifilament yarn may be a multifilament yarn of polyester fibers. The monofilament yarn containing composite fibers may be formed by polyester type conjugated fibers in which multi-component fibers of plural kinds of polyesters (e.g., PET and PTT) are spun. The composite yarn may be a covering yarn in which core yarn and/or sheath yarn are stretchable fiber (e.g., a covering yarn in which the core yarn is stretchable fiber such as polyurethane fibers and the sheath yarn is polyester fiber such as PET fiber), a composite yarn of the above-described conjugated fibers, or the like.

Of those, the non-water absorptive thread containing polyester fibers is preferred from the standpoint that abrasion resistance can be improved, and non-composite yarn or composite yarn formed by polyester type conjugate fiber (particularly, non-composite yarn) is particularly preferred from the standpoint that oozing of a rubber can be also suppressed. The polyester type conjugate fiber may be crimpable fiber (bulky fiber) in which plural polyester resins are formed in a layer form, and may be, for example, a fiber having a structure that PET and PTT in substantially equimolar amounts are laminated in a layered form. The non-composite yarn formed by polyester type conjugate fibers may be used by twisting a plurality of the yarns.

The tex of the water absorptive thread and non-water absorptive thread each may be about, for example, from 20 to 600 dtex, and preferably from 50 to 300 dtex.

In the present invention, in order to improve quietness when exposed to water, the proportion of the water absorptive thread is 30% by mass or more (e.g., from 30 to 100% by mass, and preferably from 30 to 99% by mass) based on the total amount of the water absorptive thread and the non-water absorptive thread (i.e., based on the total amount of yarns constituting the warp knitted fabric). In detail, the mass ratio between the both threads may be water absorptive thread/non-water absorptive thread=about from 30/70 to 99/1, preferably from 40/60 to 95/5, and more preferably from 50/50 to 90/10 (particularly from 60/40 to 80/20). In the case where the proportion of the water absorptive thread is too small, water absorption when exposed to water deteriorates, and as a result, quietness when exposed to water deteriorates.

(Adhesion Treatment of Warp Knitted Fabric)

An adhesion treatment may be applied to the warp knitted fabric, as necessary. The adhesion treatment can improve not only adhesiveness to a frictional power transmission surface (or a compression layer described hereinafter) but also abrasion resistance. Examples of the adhesion treatment include a dipping treatment in a resin-based treatment liquid obtained by dissolving an adhesive component (e.g., an epoxy compound or an isocyanate compound) in an organic solvent (toluene, xylene, methyl ethyl ketone, etc.), a dipping treatment in a resorcin-formalin-latex liquid (RFL liquid), and a dipping treatment in a rubber paste obtained by dissolving a rubber composition in an organic solvent. Examples of other adhesion treatment that can be used include a friction treatment in which a rubber composition is printed on a warp knitted fabric by passing the warp knitted fabric and the rubber composition through calendar rolls, a spreading treatment in which a rubber paste is applied to a warp knitted fabric, and a coating treatment in which a rubber composition is laminated on a warp knitted fabric.

(Surfactant)

The warp knitted fabric may contain a surfactant. The containing form is not particularly limited, and in many cases, the surfactant adheres to the warp knitted fabric. In the present invention, by making the warp knitted fabric to contain a surfactant and combining the water absorptive fibers and the surfactant, the surfactant decreases surface tension of water droplets adhered to a frictional power transmission surface, thereby increasing wettability to water, and water wet-spreads on the frictional power transmission surface. Therefore, water absorption by the water absorptive thread can be efficiently performed. As a result, quietness can be maintained even under the severe conditions that the number of rotation of pulleys varies when exposed to water.

The surfactant is not particularly limited, and the conventional surfactants such as an ionic surfactant or nonionic surfactant can be used.

The ionic surfactant may be an anionic surfactant such as a sulfonate (alkyl benzene sulfonate, α-olefin sulfonate, alkane sulfonate, etc.), a sulfate (alkyl sulfate, poly EO alkyl ether sulfuric acid ester salt, etc.), a long chain aliphatic acid salt, a naphthalene sulfonic acid-formalin condensate, a phosphoric ester (aliphatic phosphoric ester type, aromatic phosphoric ester type, alkyl phosphate, etc.), sulfosuccinic ester salt, and the like; a cationic surfactant such as alkyl trimethylammonium salt, dialkyl dimethylammonium salt and the like; an amphoteric surfactant such as alkyl betain, imidazoline derivative and the like; and the like.

The nonionic surfactant may be, for example, a polyethylene glycol-type (polyoxyethylene-type) nonionic surfactant or a polyhydric alcohol-type nonionic surfactant.

The polyethylene glycol-type nonionic surfactant is a nonionic surfactant in which to a hydrophobic base component having a hydrophobic group, such as a higher alcohol, an aralkyl alcohol, an alkylphenol, a higher fatty acid, a polyhydric alcohol higher fatty acid ester, a higher fatty acid amide, or a polypropylene glycol is added ethylene oxide to impart a hydrophilic group.

Examples of the higher alcohol as the hydrophobic base component include $C_{10-30}$ saturated alcohols (alkyl alcohols) such as lauryl alcohol, tridecyl alcohol, tetradecyl alcohol, cetyl alcohol, and octadecyl alcohol, $C_{10-26}$ unsaturated alcohols (alkenyl alcohols) such as oleyl alcohol, and the like. Examples of the aralkyl alcohol include benzyl alcohol and the like. Examples of the alkylphenol include $C_{4-16}$ alkylphenols such as octylphenol and nonylphenol, and the like.

Examples of the higher fatty acid as the hydrophobic base component include saturated fatty acids (e.g., $C_{10-30}$ saturated fatty acids such as myristic acid, palmitic acid, stearic acid, arachidic acid, behenic acid, lignoceric acid, cerotic acid, and montanic acid, preferably $C_{12-28}$ saturated fatty acids, more preferably $C_{14-26}$ saturated fatty acids, and especially $C_{16-22}$ saturated fatty acids, and the like; and oxycarboxylic acids such as hydroxystearic acid; and the like), unsaturated fatty acids (e.g., $C_{10-30}$ unsaturated fatty acids such as oleic acid, erucic acid, erucic acid, linoleic acid, linolenic acid, and eleostearic acid, and the like). These higher fatty acids may be used alone or in combination of two or more kinds thereof.

The polyhydric alcohol higher fatty acid ester is an ester of a polyhydric alcohol with the above-described higher fatty acid and has an unreacted hydroxyl group. Examples of the polyhydric alcohol include alkanediols ($C_{2-10}$ alkanediols such as ethylene glycol, propylene glycol, and butanediol, etc.), alkanetriols (glycerin, trimethylolethane, trimethylolpropane, etc.), alkanetetraols (pentaerythritol, diglycerin, etc.), alkanehexaols (dipentaerythritol, sorbitol, sorbit, etc.), alkaneoctaols (sucrose, etc.), alkylene oxide adducts thereof ($C_{2-4}$ alkylene oxide adducts, etc.), and the like.

In the following, "oxyethylene", "ethylene oxide" or "ethylene glycol" is represented by "EO", and "oxypropylene", "propylene oxide" or "propylene glycol" is represented by "PO". Specific examples of the polyethylene glycol-type nonionic surfactant include polyEO higher alcohol ethers (polyEO $C_{10-26}$ alkyl ethers such as polyEO lauryl ether and polyEO stearyl ether), polyEO polyPO higher alcohol ethers (e.g., polyEO polyPO $C_{10-26}$ alkyl ethers); alkylphenol-EO adducts such as poly EO octylphenyl ether and polyEO nonylphenyl ether; fatty acid-EO adducts such as polyEO monolaurate, polyEO monooleate, and polyEO monostearate; glycerin mono- or di-higher fatty acid ester-EO adducts (EO adducts of glycerin mono- or di-$C_{10-26}$ fatty acid esters such as glycerin mono- or dilaurate, glycerin mono- or dipalmitate, glycerin mono- or distearate, and glycerin mono- or diolate), pentaerythritol higher fatty acid ester-EO adducts (pentaerythritol mono- to tri-$C_{10-26}$ fatty acid ester-EO adducts such as pentaerythritol distearate-EO adduct, etc.), dipentaerythritol higher fatty acid ester-EO adducts, sorbitol higher fatty acid ester-EO adducts, sorbit higher fatty acid ester-EO adducts, sorbitan fatty acid ester-EO adducts such as polyEO sorbitan monolaurate, polyEO sorbitan monostearate, and polyEO sorbitan tristearate, polyhydric alcohol fatty acid ester-EO adducts such as sucrose higher fatty acid ester-EO adducts; higher alkylamine-EO adducts such as polyEO laurylamino ether and polyEO stearylamino ether; fatty acid amide-EO adducts such as polyEO coconut fatty acid monoethanolamide, polyEO lauric acid monoethanolamide, polyEO stearic acid monoethanolamide, and polyEO oleic acid monoethanolamide; oil and fat-EO adducts such as polyEO castor oil and polyEO hardened castor oil; polyPO-EO adducts (polyEO-polyPO block copolymers, etc.), and the like. These polyethylene glycol-type nonionic surfactants may be used alone or in combination of two or more kinds thereof.

The polyhydric alcohol-type nonionic surfactant is a nonionic surfactant in which a hydrophobic group such as a higher fatty acid is bonded to the above-described polyhydric alcohol (especially, alkanetriol to alkanehexaol such as glycerol, diglycerin, pentaerythritol, sucrose, or sorbitol). Examples of the polyhydric alcohol-type nonionic surfactant include glycerin fatty acid esters such as glycerin monostearate and glycerol monooleate, pentaerythritol fatty acid esters such as pentaerythritol monostearate and pentaerythritol di-tallowate esters, sorbitan fatty acid esters such as sorbitan monolaurate and sorbitan monostearate, sorbitol fatty acid esters such as sorbitol monostearate, sucrose fatty acid esters, alkyl ethers of polyhydric alcohols, fatty acid amides of alkanolamines such as coconut fatty acid diethanolamide, alkyl polyglycosides, and the like. These polyhydric alcohol-type nonionic surfactants may also be used alone or in combination of two or more kinds thereof, and may be used in combination with the polyethylene glycol-type nonionic surfactants.

Preferred surfactants are nonionic surfactants, in particular, polyethylene glycol-type nonionic surfactants.

The ratio of the surfactant may be about, for example, relative to 100 parts by mass of the water absorptive thread, from 0.3 to 150 parts by mass, preferably from 0.5 to 100 parts by mass, and more preferably from 1 to 50 parts by mass.

The method for incorporating (or attaching) the surfactant into (or to) the warp knitted fabric is not particularly limited and includes a method of spraying the surfactant to the water absorptive thread-containing warp knitted fabric (or the water absorptive thread), a method of coating the surfactant, a method of immersion in the surfactant, and the like. In the manufacturing method of the belt to be described later, the surfactant can be also incorporated into the fiber member by applying the surfactant to a surface of a cylindrical outer mold having a plurality of ribs engraved on the inner circumferential surface thereof and performing molding and vulcanization. Of these, from the viewpoint of capable of easy and homogeneous incorporation (or attachment) of the surfactant, the method of immersion in the surfactant (immersion treatment) is preferred.

In the above method, the surfactant may be incorporated in a form of containing a solvent (i.e., a form of a solution containing the surfactant), if necessary. Such a solvent can be appropriately selected depending on the kind or the like of the surfactant and includes, without particular limitation, general-purpose solvents such as water, hydrocarbons (e.g., aromatic hydrocarbons such as toluene and xylene), ethers (e.g., linear ethers such as diethyl ether; cyclic ethers such as dioxane and tetrahydrofuran), ketones (e.g., linear ketones such as acetone and methyl ethyl ketone; cyclic ketones such as cyclohexanone), esters (e.g., acetic acid esters such as ethyl acetate). These solvents may be used alone or as a mixed solvent.

In the solution containing the surfactant, the concentration of the surfactant may be about, for example, from 0.1 to 80% by mass (e.g., from 0.2 to 60% by mass), preferably from 0.3 to 50% by mass (e.g., from 0.4 to 40% by mass), and more preferably from 0.5 to 30% by mass, and in particular, may be 1% by mass or more (e.g., from 2 to 50% by mass (e.g., from 3 to 40% by mass), and preferably from 5 to 30% by mass (e.g., from 7 to 25% by mass)).

The immersion time in the immersion treatment is not particularly limited and may be about, for example, 1 minute or more (e.g., from 3 minutes to 10 hours), preferably 5 minutes or more (e.g., from 8 minutes to 6 hours), and more preferably 10 minutes or more (e.g., from 15 minutes to 3 hours). Furthermore, the immersion temperature (immersion treatment temperature) is not particularly limited and may be about, for example, from 10° C. to 60° C.

After the immersion treatment, if necessary, a drying treatment may be performed. The drying treatment may be performed under heating (e.g., under heating at about 50° C. or higher (e.g., from 70 to 200° C.), and preferably 100° C. or higher (e.g., from 120 to 160° C.)). The drying time is not particularly limited and may be about, for example, from 10 minutes to 120 minutes.

The frictional power transmission belt of the present invention may have a contact angle (contact angle between the surface of a frictional power transmission part and water) at 5 seconds after dropping water on the surface of the frictional power transmission part of the frictional power transmission belt of 55° or less, preferably 50° or less, and more preferably 45° or less. In order to improve quietness, particularly quietness when exposed to water, the contact angle may be adjusted to 20° or less (particularly 10° or less) by incorporating the surfactant.

(Frictional Power Transmission Belt)

It is sufficient that the frictional power transmission belt of the present invention is a frictional power transmission belt in which a frictional power transmission surface is covered with a warp knitted fabric, and is generally a frictional power transmission belt containing a tension layer forming the back of the belt, a compression layer formed on one surface of the tension layer and contacting pulleys at a side surface thereof to frictionally engage, and a tension member embedded along a longitudinal direction of the belt between the tension layer and the compression layer, in which the surface (frictional power transmission surface) of at least a part of the compression layer, which comes into contact with pulleys, is covered with the warp knitted fabric containing a water absorptive thread.

In the frictional power transmission belt of the present invention, in order to improve adhesiveness between the tension member and the tension layer or compression layer, an adhesion layer may be provided between the compression layer and the tension layer, as necessary. The form in which the adhesion layer is provided may be the form in which the tension member is embedded therein, and may be the form in which the tension member is embedded between the compression layer and the adhesion layer or between the adhesion layer and the tension layer.

Examples of the frictional power transmission belt include various frictional power transmission belts such as a V-ribbed belt and a raw-edge V-belt. Of those, a V-ribbed belt and a V-belt in which the manufacturing process by polishing is complicated are preferred, and the V-ribbed belt in which generation of sound by exposure to water becomes problem is particularly preferred.

FIG. 1 is a schematic cross-sectional view illustrating one example of a frictional power transmission belt (V-ribbed belt) of the present invention. The belt 1 has a form in which a warp knitted fabric (fiber member) 5, a compression layer (compression rubber layer) 2 that is formed of a rubber composition, a tension member 3, and a tension layer 4 composed of a cover canvas (woven fabric, knitted fabric, non-woven fabrics, etc.) are laminated from a belt bottom surface (inner circumferential surface, ventral surface) to a belt top surface (back face) in the order.

In this belt 1, the tension member 3 is embedded along the belt longitudinal direction and a part thereof is in contact with the tension layer 4 and the remaining part is in contact with the compression layer 2.

In the compression layer 2, a plurality of grooves having a V-shaped cross-section, which extend in the belt longitudinal direction, are formed. A plurality of ribs (three pieces in the example illustrated in FIG. 1) having a V-shaped cross-section (inverted trapezoid) are formed between the grooves, and two inclined faces (surface) of the ribs serving as the frictional power transmission part form the frictional power transmission surface and come into contact with the pulley to transmit power (frictional power transmission). The rib surface (frictional power transmission surface) is covered with the warp knitted fabric 5.

The frictional power transmission belt of the present invention is not limited to this form. For example, the tension layer 4 may be formed of a rubber composition and an adhesion layer may be provided between the compression layer 2 and the tension layer 4. The following will describe details of individual layers constituting the belt.

(Compression Layer)

The compression layer may be usually formed of a rubber (or a rubber composition). Examples of the rubber (rubber constituting the rubber composition) include known rubber components and/or elastomers such as diene-based rubbers (natural rubber, isoprene rubber, butadiene rubber, chloroprene rubber, styrene-butadiene rubber (SBR), acrylonitrile-butadiene rubber (nitrile rubber), hydrogenated nitrile rubber (including a mixed polymer of hydrogenated nitrile rubber and an unsaturated carboxylic acid metal salt), etc.), ethylene-α-olefin elastomers, chlorosulfonyl polyethylene rubbers, alkylated chlorosulfonyl polyethylene rubbers, epichlorohydrin rubbers, acrylic rubbers, silicone rubbers, urethane rubbers, fluororubbers, and the like. These polymer components may be used alone or in combination. Of these polymer components, in view of containing no harmful halogen, having ozone resistance, heat resistance, and cold resistance, and also being excellent in economical efficiency, ethylene-α-olefin elastomers (ethylene-α-olefin-based rubbers such as ethylene-propylene rubbers (EPR) and ethylene-propylene-diene rubbers (EPDM, etc.)) are preferred.

The ratio of the rubber to the whole compression layer (or total amount of the rubber composition) may be, for example, 20% by mass or more (e.g., from 25 to 80% by mass), preferably 30% by mass or more (e.g., from 35 to 75% by mass), and further preferably 40% by mass or more (e.g., from 45 to 70% by mass).

The compression layer (or the rubber or the rubber composition forming the compression rubber layer) may contain various additives as required.

Examples of the additives (blending agents) include known additives such as vulcanizing agents or crosslinking agents (e.g., oximes (quinone dioxime, etc.), guanidines (diphenylguanidine, etc.), metal oxides (magnesium oxide, zinc oxide, etc.), organic peroxides (diacyl peroxides, peroxy esters, dialkyl peroxides, etc.), etc.), vulcanization aids, vulcanization accelerators, vulcanization retarders, reinforcing agents (carbon black, silicon oxide such as hydrated silica, etc.), metal oxides (e.g., zinc oxide, magnesium oxide, calcium oxide, barium oxide, iron oxide, copper oxide, titanium oxide, aluminum oxide, etc.), fillers (clay, calcium carbonate, talc, mica, etc.), plasticizers, softeners (oils such as paraffin oils and naphthenic oils), processing agents or processing aids (stearic acid, stearic acid metal salts, waxes, paraffins, etc.), anti-aging agents (aromatic amine-based, benzimidazole-based anti-aging agents, etc.), adhesion improving agents (resorcin-formaldehyde co-condensate, melamine resins such as hexamethoxymethylmelamine, co-condensates thereof (resorcin-melamine-formaldehyde co-condensates etc.), etc.), colorants, tackifiers, coupling agents (silane coupling agents, etc.), stabilizers (antioxidants, UV absorbers, thermal stabilizers, etc.), lubricants, flame retardants, and antistatic agents, and the like.

These additives may be used alone or in combination and is appropriately selected depending on the kind, use, performance and the like of the rubber and used.

The ratios of the additives can also be appropriately selected depending on the kind and the like of the rubber. For example, the reinforcing agents (carbon black, etc.) may be, relative to 100 parts by mass of the rubber, 10 parts by mass or more (e.g., from 20 to 150 parts by mass), preferably 20 parts by mass or more (e.g., from 25 to 120 parts by mass), further preferably 30 parts by mass or more (e.g., from 35 to 100 parts by mass), and particularly 40 parts by mass or more (e.g., from 50 to 80 parts by mass).

The compression layer may contain or may not contain a surfactant (the compounds exemplified in the section of the wrap knitted fabric, etc.).

The compression layer (or rubber composition) may contain a short fiber. Examples of the short fiber include short fibers of the fibers exemplified in the section of the wrap knitted fabric (e.g., cellulose-based fibers such as cotton or rayon, polyester-based fibers (PET fibers, etc.), polyamide fibers (fibers of aliphatic polyamides such as polyamide 6, aramid fibers, etc.), etc.). The short fiber may be a water absorptive fiber. The short fibers may be used alone or in combination of two or more kinds thereof.

The average fiber length of the short fiber may be about, for example, from 0.1 to 30 mm (e.g., from 0.2 to 20 mm), preferably from 0.3 to 15 mm, and further preferably from 0.5 to 5 mm.

These short fibers may be, if necessary, subjected to a surface treatment with a surfactant, silane coupling agent, epoxy compound, diisocyanate compound, or the like.

The ratio of the short fiber may be about, relative to 100 parts by mass of the rubber, for example, from 0.5 to 50 parts by mass (e.g., from 1 to 40 parts by mass), and preferably from 3 to 30 parts by mass (e.g., from 5 to 25 parts by mass).

The thickness of the compression layer (compression rubber layer, etc.) can be appropriately selected depending on the kind and the like of the belt but may be about, for example, from 1 to 30 mm, preferably from 1.5 to 25 mm, and further preferably from 2 to 20 mm.

(Tension Member)

The tension member is not particularly limited and may be composed of, for example, a synthetic fiber such as polyester fibers (polyalkylene arylate-based fiber) or aramid fibers, an inorganic fiber such as carbon fibers, or the like.

As the tension member, use can be usually made of a twisted cord (e.g., plied, single twist, Lang lay, etc.) using a multifilament yarn. The average cord diameter of the tension member (fiber diameter of the twisted cord) may be about, for example, from 0.5 to 3 mm, preferably from 0.6 to 2 mm, and more preferably from 0.7 to 1.5 mm. The tension member may be embedded in the belt longitudinal direction or may further be multiply embedded in parallel at a predetermined pitch in the belt longitudinal direction.

In order to improve the adhesion to a rubber, the tension member may be subjected to various adhesive treatments with an epoxy compound, an isocyanate compound, or the like, as in the case of the short fiber.

(Tension Layer)

The tension layer may be formed of the same rubber composition as in the case of the compression layer, or may be formed of a fabric (reinforcing fabric) such as canvas.

Examples of the reinforcing fabric include fabrics such as woven fabrics, wide-angle canvas, knitted fabrics, and non-woven fabrics. Of these, woven fabrics that are woven in the form of plain weave, twill weave, or satin weave, wide-angle canvas in which the intersection angle between the warp yarn and the weft yarn is from about 90° to 120°, and knitted fabrics are preferred. As the fibers constituting the reinforcing fabric, the fibers exemplified in the section of the fiber member (water absorptive fibers, non-water absorptive fibers, etc.) can be utilized.

The reinforcing fabric may be subjected to an adhesive treatment (e.g., the adhesion treatment as exemplified in the section of fiber member). Furthermore, after the adhesive treatment (treatment (immersion treatment, etc.) with the RFL solution), it may be further subjected to friction in which a rubber composition is rubbed therein or lamination (coating), to form a canvas with a rubber.

In the case where the tension layer is formed of a rubber (rubber composition), as the rubber component in the rubber composition constituting the tension layer, the same line or the same kind of rubber as the rubber component of the rubber composition of the compression layer is used in many cases. In addition, the ratios of the each additive such as the vulcanizing agent or the cross-linking agent, the co-cross-linking agent or the vulcanization aid, and the vulcanization accelerator can be also selected from the same ranges as in the case of the rubber composition of the compression layer.

The rubber composition may contain the same short fiber as in the case of the compression layer, in order to suppress the generation of noise owing to sticking of the back face rubber during back face driving. The short fiber may be randomly oriented in the rubber composition. Further, the short fiber may be a partially bent short fiber.

In order to suppress the noise during back face driving, an uneven pattern may be provided on the surface (belt back surface) of the tension layer. Examples of the uneven pattern include a knitted fabric pattern, a woven fabric pattern, a cord woven fabric pattern, an embossed pattern, and the like. Of these patterns, the woven fabric pattern and the embossed pattern are preferred. Furthermore, at least a part of the back face of the tension layer may be covered with a warp knitted fabric.

The thickness of the tension layer can be appropriately selected depending on the kind and the like of the belt, but may be about, for example, from 0.5 to 10 mm, preferably from 0.7 to 8 mm, and further preferably from 1 to 5 mm.

(Adhesion Layer)

The adhesion layer is, as described above, not necessarily required. The adhesion layer can be configured with, for example, the same rubber composition (rubber composition containing a rubber component such as ethylene-α-olefin elastomer) as in the case of the compression layer (compression rubber layer). In the rubber composition of the adhesion layer, as the rubber component, the same line or the same kind of rubber as the rubber component in the rubber composition of the compression rubber layer is used in many cases. In addition, the ratios of the each additive such as the vulcanizing agent or the cross-linking agent, the co-cross-linking agent or the vulcanization aid, and the vulcanization accelerator can be also selected from the same ranges as in the case of the rubber composition of the compression layer. The rubber composition of the adhesion layer may further contain an adhesion improving agent (resorcin-formaldehyde co-condensation product, an amino resin, etc.).

The thickness of the adhesion layer can be appropriately selected depending on the kind and the like of the belt, but may be about, for example, from 0.2 to 5 mm, preferably from 0.3 to 3 mm, and further preferably from 0.5 to 2 mm.

(Method for Manufacturing Frictional Power Transmission Belt)

A method for manufacturing the power transmission belt of the present invention is not particularly limited, and known or conventional methods can be employed. For example, the belt can be formed by laminating a warp knitted fabric, a compression layer composed of a rubber (or rubber composition), a tension member, and a tension layer, molding the resulting laminate cylindrically in a molding mold, vulcanizing it to form a sleeve, and cutting the vulcanized sleeve into a predetermined width. In the manufacturing method of the present invention, the warp knitted fabric is laminated so that the wale direction becomes parallel to a belt longitudinal direction. More specifically, a V-ribbed belt can be manufactured, for example, by the following method.

(First Manufacturing Method)

First, a cylindrical inner mold having a flexible jacket mounted on the outer circumferential surface thereof is used as an inner mold. An unvulcanized sheet for a tension layer is wound on the flexible jacket on the outer circumferential surface, a cord is helically spun on the sheet, and further, thereon are wound an unvulcanized sheet for a compression layer and a warp knitted fabric to prepare a laminate. At this time, the warp knitted fabric is wound so that the wale direction faces a belt longitudinal direction (belt circumferential direction).

As for the warp knitted fabric covering the surface of ribs, a sheet-type warp knitted fabric, which has been cut into a predetermined size depending on the belt size, may be use, or a cylindrical and seamless warp knitted fabric may be used. The end portions of the sheet-type warp knitted fabric are jointed with each other by means of ultrasonic welding, machine joint, hot melt, or the like.

Next, a cylindrical outer mold where a plurality of rib molds are engraved on the inner circumferential surface thereof is used as an outer mold capable of being mounted on the inner mold. The inner mold on which the laminate has been wound is concentrically set in the outer mold. Thereafter, the flexible jacket is expanded toward the inner circumferential surface (rib molds) of the outer mold and the laminate (compression layer) is press-fitted to the rib molds, followed by vulcanization. Then, after the inner mold is taken out from the outer mold and the vulcanized rubber sleeve having a plurality of ribs is released from the outer mold, the vulcanized rubber sleeve is cut into a predetermined width along a belt longitudinal direction by using a cutter to finally form a V-ribbed belt. In this first manufacturing method, the sleeve (or V-ribbed belt) having a plurality of ribs can be finally formed at once by expanding the laminate having the tension layer, the tension member, and the compression layer.

(Second Manufacturing Method)

In connection with the first manufacturing method, for example, there may be adopted the method disclosed in JP-A-2004-82702 (a method in which only a compression layer is expanded to form a preform (semi-vulcanized state), then a tension layer and a tension member are expanded and press-bonded to the preform, and they are vulcanized and integrated to finally form a V-ribbed belt).

EXAMPLES

The following will explain the present invention in more detail based on Examples, but the present invention is not limited to these Examples. Incidentally, the followings show the measurement methods, evaluation methods or the like of individual properties.

(Areal Weight of Knitted Fabric)

According to JIS L1096 (2010), three samples obtained by cutting a knitted fabric into a size of 200×200 mm were collected, and the respective masses were measured by a balance, and averaged.

(Average Thickness of Knitted Fabric)

According to JIS L1096 (2010), a knitted fabric from which unnatural wrinkles and tension had been removed was placed on a flat table, and thicknesses at five places were measured with a constant load type thickness meter, and averaged.

(Density of Knitted Fabric)

According to JIS L1096 (2010), a knitted fabric from which unnatural wrinkles and tension had been removed was placed on a flat table, and the number of stitches in an arbitrary 1 inch length was measured at five places, and averaged.

(Tensile Strength at Break and Elongation of Knitted Fabric)

According to JIS L1096 (2010), three test pieces each having a size of 5 cm width×25 cm length were collected in each of a wale direction and a course direction. Those test pieces were subjected to a tensile test in a tensile rate of 200 mm/min by an automatic type tensile testing machine, and elongation at 50 N and tensile strength at break were measured.

(Bulkiness of Knitted Fabric)

Bulkiness (cm³/g) was obtained by the following equation based on the thickness and areal weight of a knitted fabric.

$$\text{Bulkiness} = \text{Thickness (mm)/areal weight (g/m}^2\text{)} \times 1000$$

(Amount of Surfactant Adhered)

Masses of a knitted fabric and belt were measured before and after the treatment by a surfactant and before and after vulcanization, and the amount (content) $W_N$ (g/m²) of the surfactant adhered per 1 m² of a knitted fabric before vulcanization and the amount (content) $W_R$ (g/m²) of the surfactant adhered per 1 m² of a knitted fabric after vulcanization were obtained by the following equations.

$$W_N = (N_2 - N_1)/S_N \text{ (g/m}^2\text{)}$$

$$W_R = (N_2 - N_1)/S_R \text{ (g/m}^2\text{)}$$

(In the equations, $N_1$ is a mass of a knitted fabric (main body of a knitted fabric) before an adhesion treatment, $N_2$ is a mass of a knitted fabric after an adhesion treatment, $S_N$ is an area of a knitted fabric, $R_1$ is a mass after vulcanization of a belt that was not subjected to an adhesion treatment, $R_2$ is a mass after vulcanization of a belt that was subjected to an adhesion treatment, and $S_R$ is an area of a knitted fabric in a belt).

The amount (parts by mass) of a surfactant adhered per 100 parts by mass of a water absorptive thread (or main body of a knitted fabric) was measured from the areal weight of a knitted fabric.

(Oozing of Rubber on Frictional Power Transmission Surface)

Oozing of a rubber on the surface of a warp knitted fabric of a V-ribbed belt after molding was visually observed and evaluated.

(Friction Coefficient (SAE μ Method))

A testing machine in which a driving pulley (Dr.) having a diameter of 121.6 mm, an idler pulley (IDL. 1) having a diameter of 76.2 mm, an idler pulley (IDL. 2) having a diameter of 61.0 mm, an idler pulley (IDL. 3) having a diameter of 76.2 mm, an idler pulley (IDL. 4) having a diameter of 77.0 mm, and a driven pulley (Dn.) having a diameter of 121.6 mm had been arranged in the order, whose layout is illustrated in FIG. 2, was used for the measurement of a friction coefficient.

That is, a V-ribbed belt was laid over each pulley of the testing machine. The number of rotation of the driving pulley was set to 400 rpm and a belt winding angle to the driven pulley was set to 20° under room temperature condition (25° C.) in the ordinary traveling (DRY). The belt was made traveling with applying a constant load [180 N/6Rib], and torque of the driven pulley was increased to from 0 to at most 20 Nm. Friction coefficient μ was obtained from a torque value of the driven pulley when a slip rate of the belt to the driven pulley reached the maximum (100% slip) by the following equation.

$$\mu = \ln(T1/T2)/\alpha$$

In the above equation, T1 is tensile at tension side, T2 is tensile at relaxing side, α is a belt winding angle to a driven pulley, and those can be obtained by the following equations, respectively.

$$T1 = T2 + Dn. \text{ torque (kgf·m)/(121.6/2000)}$$

$$T2 = 180 \text{ (N/6Rib)}$$

$$\alpha = \pi/9 \text{ (rad)}$$

(In the Equation, Rad Means Radian)

A testing machine whose layout is illustrated in FIG. 3 was used for the measurement of a friction coefficient during traveling while pouring water (WET). The traveling conditions are the same as the ordinary traveling, except that the number of rotation of a driving pulley is set to 800 rpm, a belt winding angle to a driven pulley is set to 45° ($\alpha=\pi/4$) and water is continuously poured in an amount of 300 ml per one minute to the vicinity of an inlet of a driven pulley, and the friction coefficient $\mu$ was similarly obtained by using the above equation.

(Sound Generation Resistance)

Misalignment sound generation evaluation test (sound generation limit angle) was conducted by using a testing machine in which a driving pulley (Dr.) having a diameter of 101 mm, an idler pulley (IDL. 1) having a diameter of 80 mm, a misalignment pulley (W/P) having a diameter of 128 mm, an idler pulley (IDL. 2) having a diameter of 80 mm, a tension pulley (Ten.) having a diameter of 61 mm, and an idler pulley (IDL. 3) having a diameter of 80 mm had been arranged in this order, whose layout is illustrated in FIG. 4. An axis distance (span length) between the idler pulley (IDL. 1) and the misalignment pulley was set to 135 mm, and all of the pulleys were adjusted so as to locate on the same plane (angle of misalignment: 0°).

That is, a V-ribbed belt was laid over each pulley of the testing machine, and the belt was traveled with applying tension such that the number of rotation of the driving pulley is 1,000 rpm and belt tension is 50 N/Rib under room temperature condition while periodically (about 30 seconds intervals) pouring 5 cc of water to a frictional power transmission surface of the V-ribbed belt in the vicinity of an outlet of the driving pulley. At this time, the misalignment pulley was shifted to the near side to each pulley, and an angle at which sound generation occurs in the vicinity of an inlet of the misalignment pulley (sound generation limit angle) was obtained. Silence is excellent with increasing the sound generation limit angle, and was judged by the following criteria.

S: No sound generation until rib dislocation (silence is extremely good)

A: Sound generation angle is 2° or larger and smaller than 3° (silence is good)

B: Sound generation angle is smaller than 2° (silence is poor)

Generally a belt is dislocated from a pulley in the vicinity of 3° (that is, rib dislocation), and the state that power does not normally transmits occurs.

(Durability Test (High Temperature and High Tension Reverse Bending Test))

High temperature and high tension reverse bending test was conducted by using a testing machine in which a driving pulley (Dr.) having a diameter of 120 mm, an idler pulley (IDL.) having a diameter of 75 mm, a driven pulley (Dn.) having a diameter of 120 mm, and a tension pulley (Ten.) having a diameter of 60 mm had been arranged in this order, whose layout is illustrated in FIG. 5. In detail, a V-ribbed belt was laid over each pulley of the testing machine, the number of rotation of the driving pulley was set to 4,900 rpm, a belt winding angle to the idler pulley and tension pulley was set to 90°, and a driven pulley load was set to 8.8 kW. The belt was traveled at an ambient temperature of 120° C. while applying a constant load [91 kg/6 Rib]. The travel time was stopped by 200 hours, and the above-described sound generation resistance was evaluated.

(Contact Angle)

The contact angle $\theta$ between the frictional power transmission surface of the belt and water (the angle formed by the tangent line in the end point of the water droplet with the frictional power transmission surface) can be determined from the projection photograph of a water droplet when water is dropped to the frictional power transmission surface, as illustrated in FIG. 6, from the following equation using the $\theta/2$ method.

$$\theta = 2\theta_1 \quad (1)$$

$$\tan\theta_1 = h/r \rightarrow \theta_1 = \tan^{-1}(h/r) \quad (2)$$

(in the equations, $\theta_1$ is the angle of a straight line connecting the vertex with the end point of the water droplet (left end point in FIG. 6) with respect to the frictional power transmission surface, h represents the height of the water droplet, and r represents the radius of the water droplet).

When the equation (2) is substituted into the equation (1), the following equation (3) is obtained.

$$\theta = 2\tan^{-1}(h/r) \quad (3)$$

As for the measurement, under room temperature (25° C.) conditions, r and h were measured from the projection photograph of the dropped water droplet by using a full automatic contact angle meter (CA-W type, manufactured by Kyowa Interface Science Co., Ltd.) and the contact angle was calculated by using the equation (3). In the measurement, the contact angle immediately after water dropping (after 5 seconds) was calculated. The smaller contact angle $\theta$ indicates that the frictional power transmission surface is more excellent in affinity to water. In particular, the fact that the contact angle $\theta$ becomes 0° indicates that the water droplet is spread all over the contact surface.

(Rotational Fluctuation Sound Generation Test)

Rotational fluctuation sound generation test was conducted by using a testing machine in which an alternator pulley (ALT) having a diameter of 55 mm, an idler pulley (IDL) having a diameter of 50 mm, a cramp pulley (CR) having a diameter of 120 mm, and an auto tensioner (A/T) having a diameter of 65 mm had been arranged in this order, whose layout is illustrated in FIG. 7. A V-ribbed belt (6PK1100, the number of rib: 6, effective length: 1,100 mm) was laid over each pulley, and the belt was rotated in a clockwise direction.

In detail, a V-ribbed belt was laid over each pulley of the testing machine. Tension was applied such that the number of rotation of the driving pulley is 1,000±100 rpm (rotational fluctuation: 20%) and belt tension is 50 N/Rib under room temperature condition (25° C.). After pouring 50 cc of water to a frictional power transmission surface of the V-ribbed belt in the vicinity of an inlet of the cramp pulley while rotating with hands, the belt was traveled. At this time, a load of the alternator pulley (alternator load) was increased (at most 100 A), a sound level meter was arranged at a position of 100 mm from the end of the alternator pulley, and the presence or absence of sound generation was measured. The large alternator load at the time of sound generating indicates that the belt is difficult to generate sound, and it was judged by the following criteria.

S: No sound generation up to alternator load of 100 A (ampere)

A: Sound was generated in alternator load of from 70 to 100 A

B: Sound was generated in alternator load of less than 70 A (silence is poor)

(Abrasion Test (6% Slip Abrasion Test))

Abrasion test was conducted by using a testing machine in which a driving pulley (Dr.) having a diameter of 80 mm, a driven pulley (Dn.) having a diameter of 80 mm and a tension pulley (Ten.) having a diameter of 120 mm had been arranged in this order, whose layout is illustrated in FIG. 8. In detail, a V-ribbed belt was laid over each pulley of the testing machine, the number of rotation of the driving pulley was set to 3,000 rpm, a belt winding angle to the tension pulley was set to 90°, and tension was applied such that a slip ratio is 6% under a certain load. The belt was traveled for 24 hours. A belt mass of the V-ribbed belt before and after the traveling test was measured, and abrasion amount was calculated from mass loss.

(Rubber Composition)

The rubber composition shown in Table 1 was rubber-kneaded by Banbury mixer, and the kneaded rubber was passed through calender rolls to prepare an unvulcanized rolled rubber sheet (sheet for a compression layer) having a given thickness. Furthermore, a sheet for a tension layer was similarly prepared. Each component in the rubber composition is as follows.

EPDM: "NORDEL IP4640" manufactured by The Dow Chemical Company

Zinc oxide: Zinc Oxide III manufactured by Seido Chemical Industry Co., Ltd.

Carbon black: "SEAST V" manufactured by Tokai Carbon Co., Ltd., average particle size: 55 nm Anti-aging agent: "NOCRAC MB" manufactured by Ouchi Shinko Chemical Industrial Co., Ltd.

Softener: Paraffinic oil, "NS-90" manufactured by Idemitsu Kosan Co., Ltd.

Organic peroxide: "PERCUMYL D-40" manufacture by NOF Corporation

TABLE 1

| Material | Composition (Parts by mass) |
|---|---|
| EPDM | 100 |
| Zinc oxide | 5 |
| Stearic acid | 1 |
| Carbon black | 60 |
| Anti-aging agent | 2 |
| Softener | 5 |
| Organic peroxide | 2 |
| Total | 175 |

(Tension Member)

A polyester cord having a constitution of 1100 dtex/2×3 was used. In order to improve adhesiveness to a rubber, the cord was subjected to immersion treatment in a resorcin-formalin-latex liquid (RFL liquid), and then subjected to a coating treatment using a treating liquid obtained by dissolving a rubber composition containing EPDM in toluene.

(Knitted Fabric)

Warp knitted fabrics A to D and F and weft knitted fabric E as shown in Table 2 were used.

TABLE 2

| | A | B | C | D | E | F |
|---|---|---|---|---|---|---|
| Knitting manner | Warp knitting | Warp knitting | Warp knitting | Warp knitting | Weft knitting | Warp knitting |
| Knitted texture | Single denbigh (Single tricot) | Single denbigh (Single tricot) | Half tricot | Single denbigh (Single tricot) | Jersey stitch | Single denbigh (Single tricot) |
| Fiber constitution | Cotton/PET/PU | Cotton/PET/PU | Cotton/PTT/PET | Cotton/PET/PU | Cotton/PET/PU | Cotton/PET/PU |
| Water absorptive thread/non-water absorptive thread (mass ratio) | 70/30 | 50/50 | 70/30 | 20/80 | 60/40 | 75/25 |
| Form of non-water absorptive thread | Covering | Covering | Conjugate (PTT and PET) | Covering | Covering | Covering |
| Areal weight of knitted fabric (g/m²) | 240 | 230 | 245 | 210 | 250 | 250 |
| Cotton ratio (mass %) | 70% | 50% | 70% | 20% | 60% | 75% |
| Knitted fabric thickness (mm) | 0.75 | 0.7 | 0.8 | 0.65 | 0.6 | 0.77 |
| Knitted fabric density (wale) (number/inch) | 40 | 40 | 40 | 44 | 45 | 40 |
| Knitted fabric density (course) (number/inch) | 44 | 30 | 25 | 28 | 44 | 44 |
| Tensile strength at break (N/5 cm) | 280 | 300 | 350 | 250 | 100 | 260 |
| Tensile elongation at 50 N (%) | 150 | 180 | 120 | 200 | 250 | 140 |
| Bulkiness (cm³/g) | 3.1 | 3.0 | 3.3 | 3.1 | 2.4 | 3.1 |

The water absorptive thread and non-water absorptive thread contained in the knitted fabric are as follows.

Water absorptive thread: Cotton spun thread

Non-water absorptive thread (covering thread): Covering thread containing a core thread of polyurethane (PU) covered with polyethylene terephthalate (PET)

Non-water absorptive thread (conjugate thread): Conjugate thread of PET and PTT (PET/PTT=50/50 mass ratio)

(Preparation of Belt)

A laminate was prepared by using a cylindrical inner mold having a flexible jacket mounted on the outer peripheral surface thereof as an inner mold, winding an unvulcanized sheet for a tension layer around the flexible jacket on the outer peripheral surface, spirally spinning a cord on the sheet, and further winding an unvulcanized sheet for a compression layer shown in Table 1 and a knitted fabric shown in Table 2 in this order. The knitted fabric was arranged such that a wale direction thereof is parallel to a belt longitudinal direction.

A knitted fabric having been subjected to an deposition treatment with a surfactant was used as the knitted fabric of Example 4. The deposition treatment was conducted by dipping the knitted fabric in a toluene solution containing a nonionic surfactant (polyoxyalkylene alkyl ether, trade name "EMULGEN" manufactured by Kao Corporation) in a concentration of 10% by mass, at room temperature (25° C.) for 30 minutes, and then drying in an oven at 143° C. for 10 minutes.

The amount of the surfactant adhered on the knitted fabric was 26.6 g per 1 $m^2$ of the knitted fabric and 15.6 parts by mass per 100 parts by mass of the knitted fabric before vulcanization, and was 17.7 g per 1 $m^2$ of the knitted fabric and 10.4 parts by mass per 100 parts by mass of the knitted fabric after vulcanization.

A cylindrical outer mold having a plurality of rib molds engraved on an inner peripheral surface thereof was used as an outer mold mountable on the inner mold, and the inner mold having the laminate wound thereon was concentrically arranged in the outer mold. Thereafter, the flexible jacket was expanded toward the inner peripheral surface (rib mold) of the outer mold to press the laminate (compression layer) in the rib mold, followed by vulcanization. The inner mold was removed from the outer mold, a vulcanized rubber sleeve having a plurality of ribs was demolded from the outer mold. Thereafter, the vulcanized rubber sleeve was cut into a given width in a belt longitudinal direction by using a cutter, thereby obtaining a V-ribbed belt (the number of ribs: 6, effective length: 1,200 mm).

The belt obtained was subjected to various measurements and evaluations. The results are shown in Table 3.

In "Sound generation limit angle" in Table 3, the expression "None" means that sound was not generated until rib dislocation.

As is apparent from the results of Table 3, in Examples, the friction coefficient was appropriately maintained in both DRY and WET, the difference in those was small, and sound generation properties (quietness) were satisfactory. Furthermore, durability was satisfactory. Particularly, in Example 4 in which a surfactant was adhered, a contact angle to water was small, and high sound generation properties were achieved.

On the other hand, in Comparative Example 1 in which the proportion of the water absorptive thread in the warp knitted fabric is small, a friction coefficient in WET is low, and quietness was poor. Furthermore, in Comparative Example 2 using a weft knitted fabric, durability was poor. Furthermore, in the comparison between Example 5 and Comparative Example 2, in which the areal weight is the same, sound generation resistance after travel deterioration was excellent in the belt of Example 5.

Although the present invention has been described in detail and by reference to the specific embodiments, it is apparent to one skilled in the art that various modifications or changes can be made without departing the spirit and scope of the present invention.

This application is based on Japanese Patent Application No. 2013-247879 filed on Nov. 29, 2013 and Japanese Patent Application No. 2014-235672 filed on Nov. 20, 2014, the disclosures of which are incorporated herein by reference.

INDUSTRIAL APPLICABILITY

The frictional power transmission belt of the present invention can be used as a frictional power transmission belt such as a V-belt or a V-ribbed belt. Furthermore, the frictional power transmission belt of the present invention can improve quietness when exposed to water, and therefore can be preferably used in a transmission apparatus used outdoor, such as bicycles, motorcycles and farm machines.

DESCRIPTION OF REFERENCE NUMERALS AND SIGNS

1: Frictional power transmission belt (V-ribbed belt)
2: Compression layer

TABLE 3

| | Example | | | | | Comparative Example | |
|---|---|---|---|---|---|---|---|
| | 1 | 2 | 3 | 4 | 5 | 1 | 2 |
| Knitted fabric | A | B | C | A | F | D | E |
| Surfactant treatment | None | None | None | Conducted | None | None | None |
| Arrangement of knitted fabric wale direction | Belt longitudinal | Belt longitudinal | Belt longitudinal | Belt longitudinal | Belt longitudinal | Belt longitudinal | Belt longitudinal |
| Rubber oozing on frictional power transmission surface | None | None | None | None | None | None | Observed |
| Friction coefficient (DRY) | 1.1 | 1 | 1.3 | 1.05 | 1.1 | 1.2 | 1.1 |
| Friction coefficient (WET) | 1.1 | 0.8 | 1.05 | 1.2 | 1.1 | 0.6 | 1.1 |
| Initial sound generation limit angle (°) | None | None | None | None | None | 1.5 | None |
| Evaluation of sound generation properties | S | S | S | S | S | B | S |
| Sound generation limit angle after travel deterioration (°) | None | None | None | None | None | 1.3 | 1.2 |
| Evaluation of sound generation properties (after travel deterioration) | S | S | S | S | S | B | B |
| Contact angle to water (°) | 40 | 55 | 50 | 5 | 40 | 80 | 40 |
| ALT load when sound generating (A) | 90 | 80 | 90 | None | 90 | 50 | 60 |
| Evaluation of sound generation properties | A | A | A | S | A | B | B |
| Abrasion rate (6% slip, after 24 hr) | 0.60% | 0.57% | 0.55% | 0.58% | 0.62% | 0.45% | 0.85% |

3: Tension member
4: Tension layer
5: Warp knitted fabric

The invention claimed is:

1. A frictional power transmission belt having a frictional power transmission surface covered with a warp knitted fabric, wherein the warp knitted fabric comprises a water absorptive thread in a proportion of 30% by mass or more based on the total amount of threads constituting the warp knitted fabric and a wale direction of the warp knitted fabric is substantially parallel to a belt longitudinal direction.

2. The frictional power transmission belt according to claim 1, wherein the warp knitted fabric further comprises a non-water absorptive thread, and a mass ratio between the water absorptive thread and the non-water absorptive thread is the former/the latter=from 50/50 to 90/10.

3. The frictional power transmission belt according to claim 2, wherein the non-water absorptive thread comprises a polyester fiber and/or a polyurethane fiber.

4. The frictional power transmission belt according to claim 1, wherein the warp knitted fabric is a single tricot knitted fabric or a half tricot knitted fabric.

5. The frictional power transmission belt according to claim 1, wherein the warp knitted fabric has an elongation of 80% or more in a course direction and a tensile strength at break of 150 N or more in a wale direction, when a load of 50 N is applied to a test piece having a size of 5 cm width and 25 cm length in a tensile test.

6. The frictional power transmission belt according to claim 1, wherein the warp knitted fabric has a density of from 20 to 60 number/inch in a wale direction and from 20 to 60 number/inch in a course direction.

7. The frictional power transmission belt according to claim 1, wherein the warp knitted fabric has a thickness of from 0.5 to 1.0 mm.

8. The frictional power transmission belt according to claim 1, wherein the warp knitted fabric has a volume per unit mass of 2.5 $cm^3/g$ or more.

9. The frictional power transmission belt according to claim 1, wherein the water absorptive thread comprises a cellulosic fiber.

10. The frictional power transmission belt according to claim 1, wherein the warp knitted fabric comprises a surfactant.

11. The frictional power transmission belt according to claim 10, wherein the surfactant is a nonionic surfactant.

12. The frictional power transmission belt according to claim 1, which is a V-ribbed belt comprising a tension layer forming the back of the belt, a compression layer formed on one surface of the tension layer and contacting pulleys at a side surface thereof to frictionally engage, and a tension member embedded along a longitudinal direction of the belt between the tension layer and the compression layer, wherein the compression layer has the frictional power transmission surface and the frictional power transmission surface is covered with the warp knitted fabric.

13. The frictional power transmission belt according to claim 12, wherein the compression layer is formed by a rubber, and the rubber does not ooze on the surface of the frictional power transmission surface covered with the warp knitted fabric.

14. A manufacturing method of the frictional power transmission belt described in claim 1, comprising a covering step of covering a frictional power transmission surface of a belt with a warp knitted fabric while setting a wale direction of the warp knitted fabric so as to be substantially parallel to a belt longitudinal direction.

* * * * *